(12) United States Patent  
Chivukula et al.

(10) Patent No.: US 12,360,880 B2
(45) Date of Patent: *Jul. 15, 2025

(54) INFRASTRUCTURE QUALITY ASSURANCE FRAMEWORK

(71) Applicant: Humana Inc., Louisville, KY (US)

(72) Inventors: Srirama Murthy Chivukula, Louisville, KY (US); Mohan Chintakayala, Louisville, KY (US); Sumit Kumar Singh, Columbia, MO (US); Keith Hamilton Meyer, Louisville, KY (US); Stephen Beasey, Louisville, KY (US)

(73) Assignee: Humana Inc., Louisville, KY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/734,726

(22) Filed: Jun. 5, 2024

(65) Prior Publication Data
US 2024/0330150 A1  Oct. 3, 2024

Related U.S. Application Data

(63) Continuation of application No. 17/517,739, filed on Nov. 3, 2021, now Pat. No. 12,026,082.

(51) Int. Cl.
G06F 11/3604 (2025.01)
G06F 8/73 (2018.01)
G06F 11/3668 (2025.01)
G06F 21/57 (2013.01)

(52) U.S. Cl.
CPC ............ G06F 11/3616 (2013.01); G06F 8/73 (2013.01); G06F 11/3688 (2013.01); G06F 21/577 (2013.01); G06F 2221/033 (2013.01)

(58) Field of Classification Search
CPC ......... H04L 41/0866–0873; G06F 8/70; G06F 8/73; G06F 11/36; G06F 11/3604; G06F 11/3616; G06F 11/3668; G06F 11/3688; G06F 11/3692; G06F 21/57; G06F 21/577; G06F 2221/033
See application file for complete search history.

(56) References Cited

U.S. PATENT DOCUMENTS

| | | |
|---|---|---|
| 10,827,036 B2 | 11/2020 | Newman et al. |
| 11,301,357 B1 | 4/2022 | Gacek et al. |
| 11,537,392 B2 | 12/2022 | Kay et al. |
| 11,604,626 B1 | 3/2023 | Sawant et al. |

(Continued)

OTHER PUBLICATIONS

Jlpiedrahita, "branch-naming-check", Github (Year: 2018).

(Continued)

Primary Examiner — Boris D Grijalva Lobos
(74) Attorney, Agent, or Firm — Standley Law Group LLP; Jeffrey S. Standley; Adam J. Smith

(57) ABSTRACT

Systems and methods for providing an automated quality assurance framework for infrastructure as code ("IaC") implementations are provided. Pull requests with proposed change to existing IaC source code ("changed code") are received from user devices, each associated with either a service enablement team member or an applications development team member. Team specific versions of the quality assurance framework are automatically triggered for the changed code which require successful passage through multiple modules, such as in a successive manner, before automatically being merged into the existing IaC source code.

20 Claims, 7 Drawing Sheets

(56) References Cited

U.S. PATENT DOCUMENTS

| | | | | |
|---|---|---|---|---|
| 12,026,082 | B2* | 7/2024 | Chivukula | G06F 8/71 |
| 2013/0152047 | A1* | 6/2013 | Moorthi | G06F 11/3664 |
| | | | | 717/124 |
| 2019/0294528 | A1 | 9/2019 | Avisror et al. | |
| 2019/0324727 | A1 | 10/2019 | Carranza et al. | |
| 2020/0177457 | A1 | 6/2020 | Seenappa et al. | |
| 2020/0394036 | A1 | 12/2020 | Morneau | |
| 2021/0011714 | A1 | 1/2021 | Goodsitt et al. | |
| 2021/0406152 | A1 | 12/2021 | Quemy | |
| 2023/0124113 | A1 | 4/2023 | Hudson et al. | |
| 2023/0132560 | A1 | 5/2023 | Bunciak et al. | |
| 2023/0136623 | A1 | 5/2023 | Chivukula et al. | |

OTHER PUBLICATIONS

Azizfcb, "Adding a checker mode to verify that all variables referenced in tasks or roles are defined", Github (Year: 2016).
Cpdohert et al., "Required features field in provider configuration". Github (Year: 2020).
Rajora, "Git Tags", toolsqa.com, (Year: 2021).
Levedahl, "git-bundle(1)—Linux man page", linux.die.net, (Year: 2016).
Vonc et al., "Backup a GitHub repository", stackoverflow.com (Year: 2009).
"About Pull Requests", Github (Year: 2021).
Git, "Recording Changes to the Repository", git-scm.com (Year: 2021).
Sunriax et al., "C# Check if github Changelog is changed and make label it's a new Update", Stackoverflow (Year: 2020).

* cited by examiner

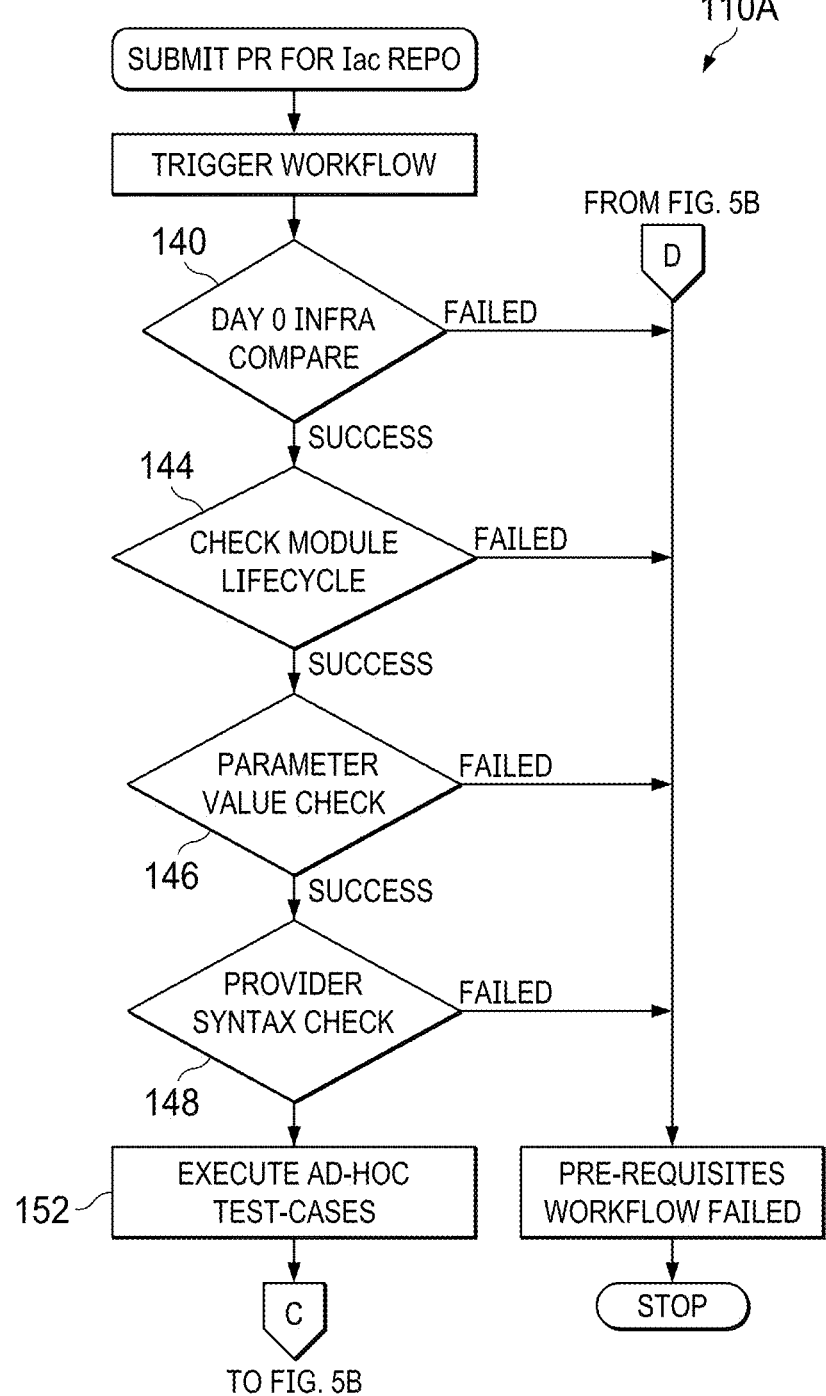

INFRASTRUCTURE QUALITY ASSURANCE FRAMEWORK

CROSS-REFERENCE TO RELATED APPLICATIONS

This application is a continuation of U.S. application Ser. No. 17/517,739 filed Nov. 3, 2021, the disclosures of which are hereby incorporated by reference as if fully restated herein.

TECHNICAL FIELD

Exemplary embodiments relate generally to systems and methods for automated quality assurance checks of infrastructure as code implementations.

BACKGROUND AND SUMMARY OF THE INVENTION

Traditionally, information technology (IT) infrastructure is managed manually. However, high human resource costs and inconsistency in configuration has led to the development of infrastructure as code (IaC). Properly implemented IaC can automate many of these traditionally manual tasks of involving IT infrastructure configuration, leading to cost reduction, scalability, and consistency, all of which may translate to the development of better applications in a more efficient manner.

However, IaC may need periodic updating, and its development is prone to human error issues. Issues with new revisions of IaC, for example, may lead to issues in application development and/or operation (DevOps). What is needed is a quality assurance framework for implementing IaC source code changes.

A quality assurance framework for implementing IaC source code changes is provided. The systems and methods detailed herein implement, in an automated fashion, quality assurance checks of proposed updates to IaC source code under development, such as prior to deployment. This may reduce problems associated with IaC revisions, for example, thereby resulting in improved DevOps. The quality assurance framework may be triggered by the receipt of pull requests (PR) from user machines.

An applications development team specific version or a service enablement team specific version of the quality assurance framework may be initiated based on whether the PR comes from a user machine or a user associated with the applications development team or the service enablement team. The service enablement team specific version of the quality assurance framework may include one or more of a naming a documentation check module, a coding standards check module, and a test cases and security check module, by way of non-limiting example. The applications development team specific version of the quality assurance framework may include one or more of an infrastructural validations module, a coding standards/compliance check module, a test cases and security check module, and a custom testcases module, by way of non-limiting example.

The system may require that each of the modules of the respective versions of the quality assurance framework be successfully passed based on one or more criteria before triggering an optional manual review. The system may be configured to require receipt of data indicating approval from the manual review process prior to implementing the proposed IaC source code changes, such as in an automated deployment fashion. The system may be configured to automatically schedule implementation of proposed IaC source code changes passing the quality assurance framework and/or manual review. The system may be configured to reject PRs associated with failure of any one of the modules of the respective versions of the quality assurance framework, and may be configured to notify users of the same.

Further features and advantages of the systems and methods disclosed herein, as well as the structure and operation of various aspects of the present disclosure, are described in detail below with reference to the accompanying figures.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein:

FIG. 5A is a flow chart with exemplary logic for the framework of FIG. 4.

DETAILED DESCRIPTION OF EXEMPLARY EMBODIMENT(S)

Various embodiments of the present invention will now be described in detail with reference to the accompanying drawings. In the following description, specific details such as detailed configuration and components are merely provided to assist the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

Embodiments of the invention are described herein with reference to illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Figure 1:
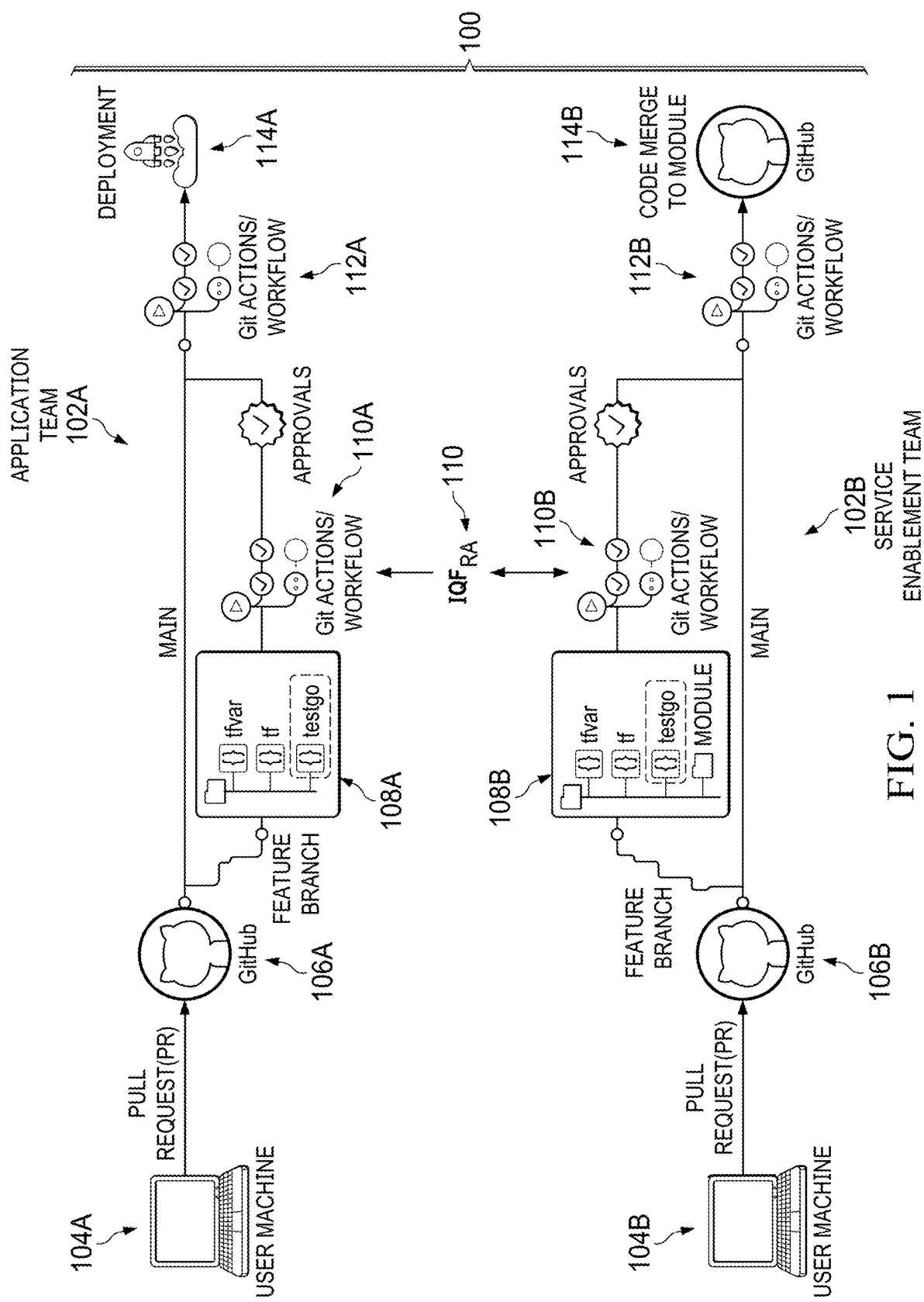
FIG. 1 is a plan view of an exemplary IaC source code change implementation workflow for DevOps.

FIG. 1 illustrates an exemplary system 100 for providing a quality assurance framework 110 for IaC source code changes. The quality assurance framework 110 may comprise multiple versions or pathways, each of which may be specific to one or more teams within a larger DevOps team associated with such IaC source code changes. For example, without limitation, the system 100 may be configured to utilize an application development specific quality assurance team version or pathway of the framework 110A for pull requests (PR) associated with one or more application teams 104A, and the system 100 may be configured to utilize a service enablement specific quality assurance team version or pathway of the framework 110B for one or more service enablement (e.g., operations) teams 104B.

The service enablement team(s) 104B may create or write modules and/or templates using IaC which may be consumed by the application team(s) 104A to build cloud infrastructure. The service enablement team(s) 104B may be tasked with ensuring that the IaC follows specified guidance and standards (e.g., industry standard coding practices), implements best practices for DevOps while updating the existing IaC source code, incorporates security policies, disaster recovery recommendations and guidelines, and that any proposed IaC source code or changes thereto are validated for building incremental infrastructure, combinations thereof, or the like.

The application team(s) 104A may consume the IaC templates and/or modules from the service enablement team(s) 104B to build or deploy cloud infrastructure. The application team(s) 104A may be tasked with building reliable infrastructure, avoiding human errors, and/or testing infrastructure before release to provide some non-limiting examples.

These frameworks 110 may be part of one or more larger workflows 102 for implementing source code changes, such as to existing IaC source code. The workflow(s) 102 may be specific to the teams 102A, 102B within the larger DevOps team. For example, without limitation, the system 100 may be configured to utilize an application development specific workflow 102A for PR associated with one or more application teams 104A, and the system 100 may be configured to utilize a service enablement specific workflow 102B for PR associated with one or more service enablement (e.g., operations) teams 104B. These workflows 102 and/or various portions thereof, such as but not limited to the quality assurance frameworks 110, may be implemented in an automated fashion.

Each team 104 may have access to the same, or different, code repositories 106. For example, without limitation, the application team(s) 104A may have access to a development code repository 106A and the service enablement team(s) 104B may have access to an end user code repository 106B. Access to such repositories 106 may be provided by way of one or more version control systems, such as but not limited to, GitHub of GitHub, Inc. of San Francisco, CA (https://github.com/). The system 100 may be configured to generate new repositories 106, or partitioned areas of such repositories 106 with each PR so as to keep proposed IaC source code changes separate from existing IaC source code until the quality assurance framework(s) 110 are successfully completed and the proposed changes are ready for merging, implementation, deployment, combinations thereof, or the like.

The system 100 may be configured such that initiation of PR associated with IaC source code may trigger one or more IaC specific reviews or pathways 108 within the larger workflows 102. The IaC specific reviews or pathways 108 may be specific to team 104 associated with the PR. For example, without limitation, the applications team(s) 104A may have one or more IaC specific reviews or pathways 108A, and the service enablement team(s) 104B may have one or more IaC specific reviews or pathways 108B. The IaC specific reviews or pathways 108, in exemplary embodiments, may be features of the GitHub platform and may be managed through GitHub's workflows and approvals processes, though such is not required.

The system 100 may be configured to require completion of any additional workflows 112 (optional) prior to implementation 114, such as generally indicated at items 114a, 114b. These additional workflows 112 may be part of the larger workflows 102 for source code changes and implementation. For example, without limitation, either or both of the applications team(s) 104A and/or the service enablement team(s) 104B may have workflows 112A, 112B, respectively, required for any source code changes, regardless of whether or not the source code changes are for IaC configuration files, for example, such as but not limited to, automatic scheduling of revision changes for implementation of the changes.

Upon completion of the workflows 108, the system 100 may be configured to automatically implement 114 the changes to the IaC source code associated with the successfully passed PR, such as by merging the proposed changes into the respective code repository or repositories 106 where they may be used.

The system 100 may be configured to automatically identify PR requiring completion of the quality assurance framework 110 and may be configured to automatically initiate framework 110 based on file type, flags, combinations thereof, or the like. The system 100 may be configured to implement the quality assurance framework 110 specific to the user device, the team 104, or user (e.g., account or credentials) associated with the PR, in exemplary embodiments.

Figure 2:
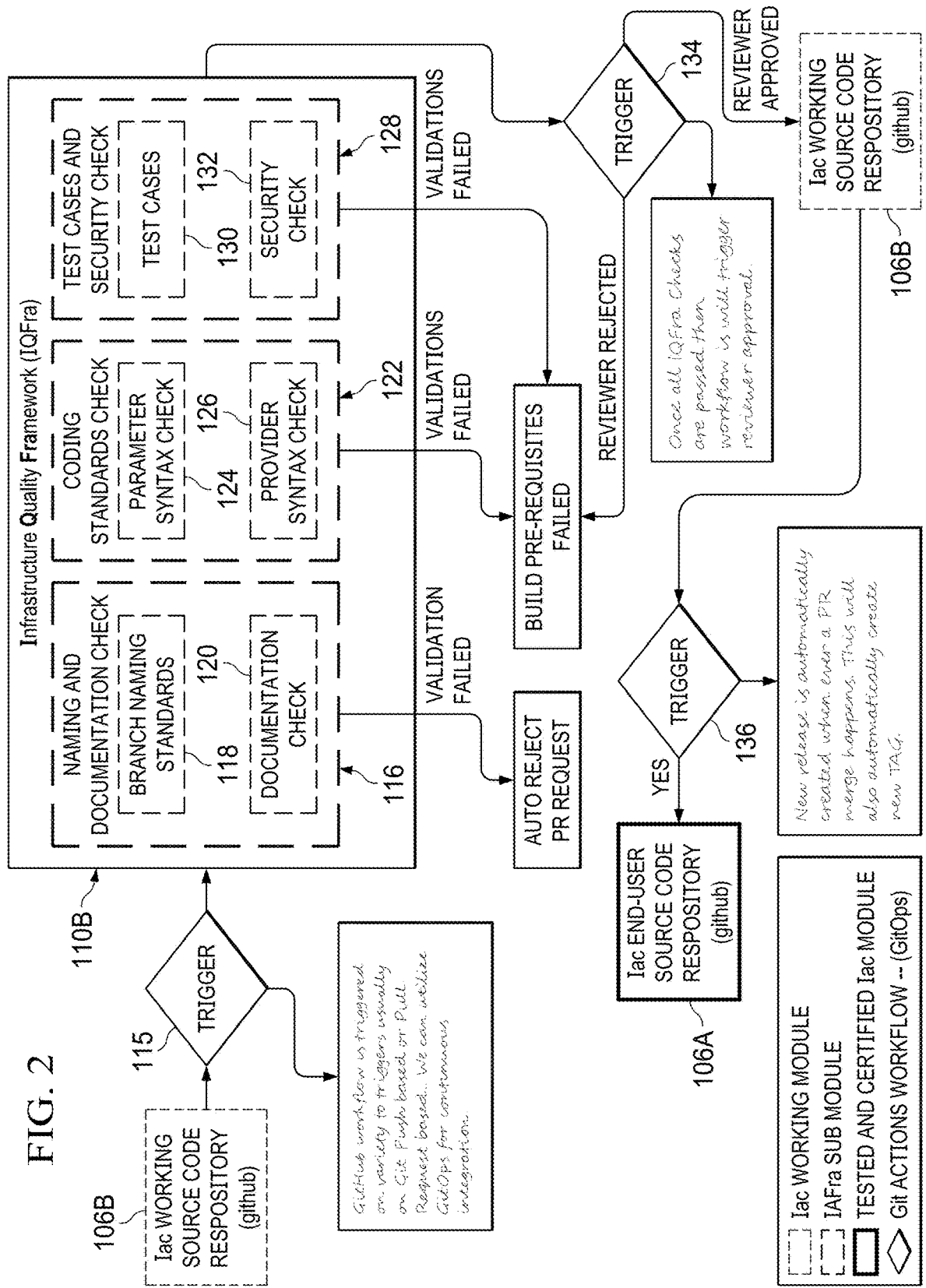
FIG. 2 is a plan view of an exemplary quality assurance framework for service enablement teams as part of the workflow of FIG. 1.
Figure 3A:
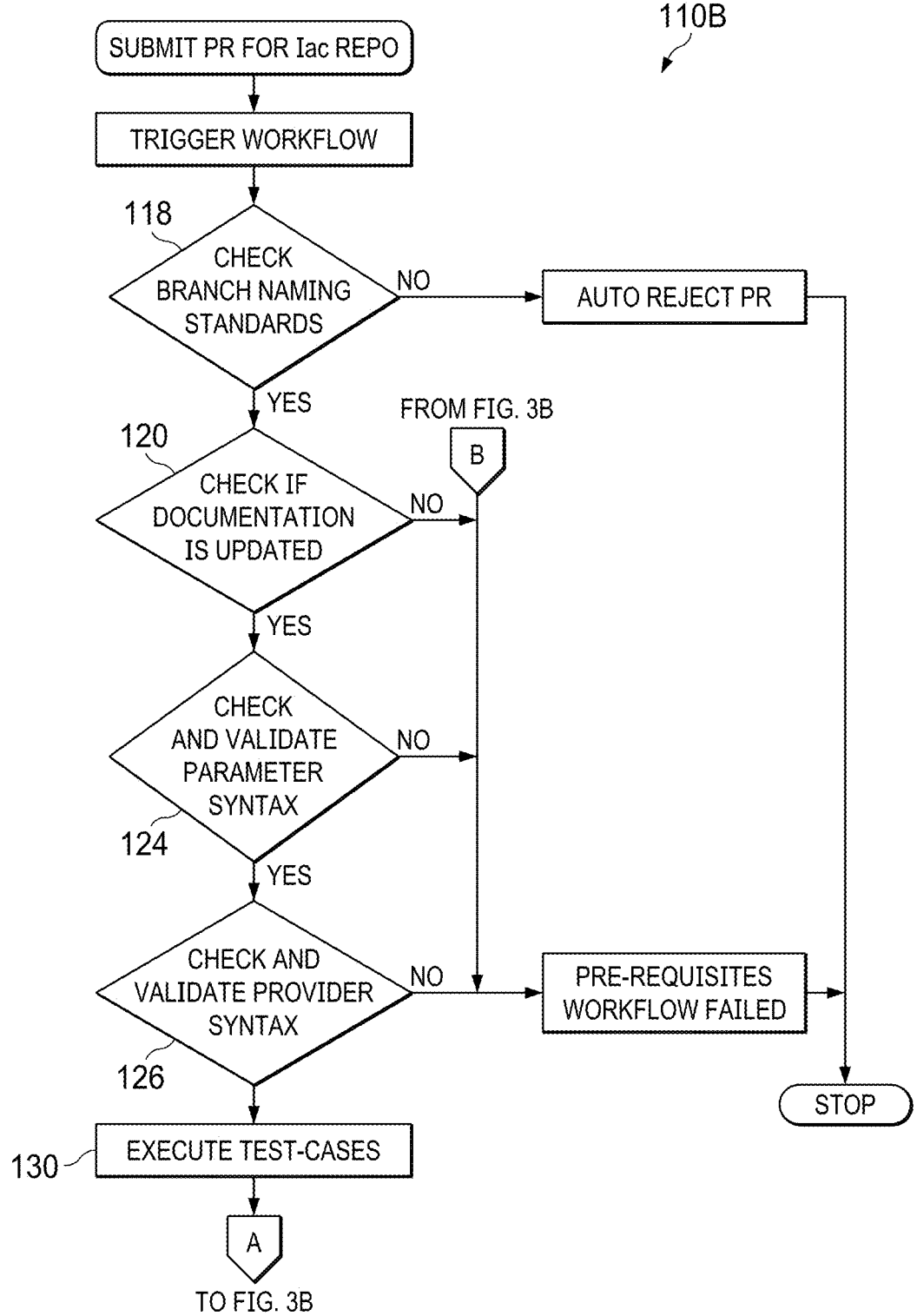
FIG. 3A is a flow chart with exemplary logic for the framework of FIG. 2.
Figure 3B:
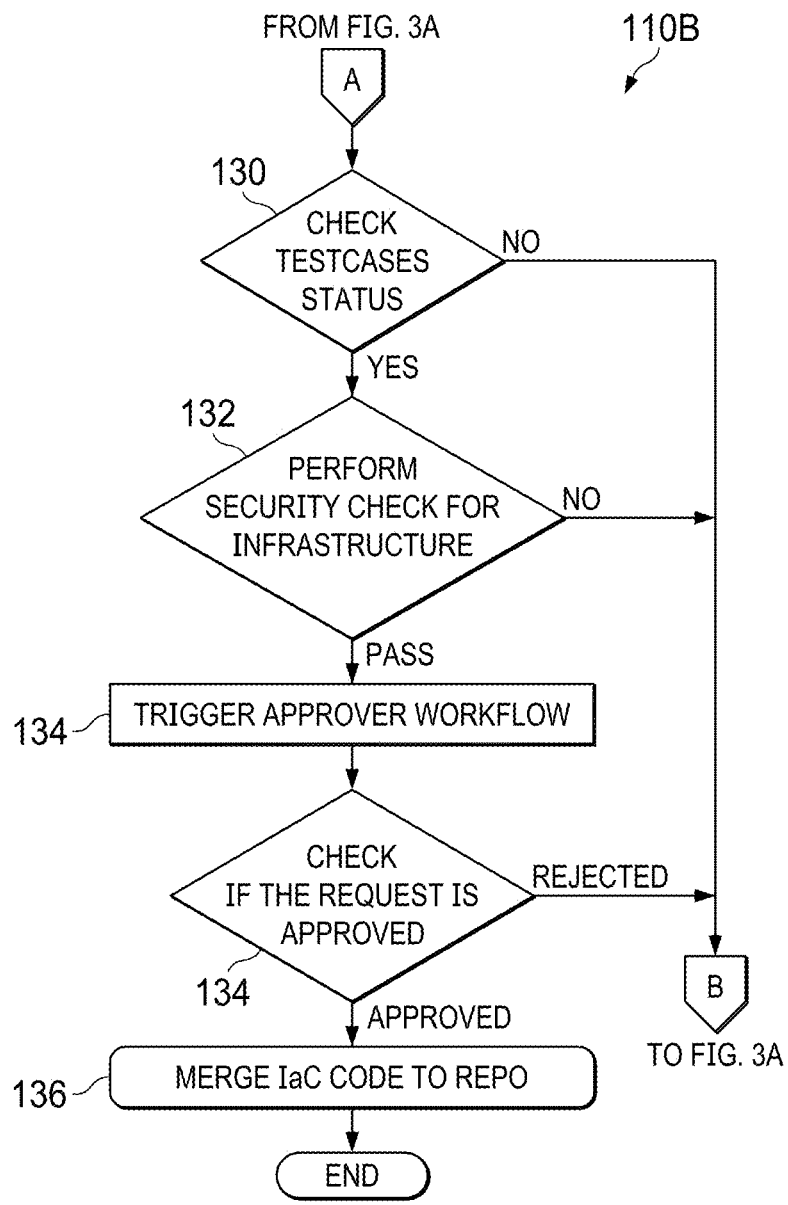
FIG. 3B is a continuation of the flow chart of FIG. 3A.

FIG. 2 illustrates an exemplary quality assurance framework 110B for the service enablement team 104B. FIG. 3A through FIG. 3B illustrate exemplary logic for the service enablement team specific version of the quality assurance framework 110B.

Upon initiation of a PR, as noted generally at item 115, proposed source code changes, such as IaC source code may be identified or placed in a repository 106B, which may be existing or created. The system 100 may be configured to automatically initiate the framework 110B. For example, without limitation, the PR may indicate that the proposed source code changes are for IaC source code or the PR may otherwise be associated with data indicating the same. The system 100 may be configured to identify that the service enablement team specific version of the quality assurance framework 110B from data in the PR, the user machine, user, or team 104 associated with the PR by way of non-limiting example.

The framework 110B may comprise a naming and documentation check module 116, a coding standards check module 122, a test cases and security check module 128, combinations thereof, or the like.

The naming and documentation check module 116 may act as a governance check, while remaining modules, such as but not limited to the coding standards check module 122 and/or the test cases and security check module 128, may act as technical checks.

The naming and documentation check module 116 may comprise a branch naming standards module 118, a documentation check module 120, combinations thereof, or the like. The system 100 may be configured to first implement the naming and documentation check module 116, though such is not required. The naming and documentation check module 116 may be configured to be completed quickly, such as within 1-2 minutes in exemplary embodiments, to give the team(s) 104B relatively immediate feedback.

The branch naming standards module 118 may comprise an automated workflow, such as performed by GitOps by way of non-limiting example, that checks for certain branch naming standards when a PR is submitted. In exemplary embodiments, without limitation, the branch naming standards module 118 may be automatically initiated upon receipt of a PR. If the branch naming standards are not followed, in exemplary embodiments, the system 100 is configured to automatically close the PR request without further action. In exemplary embodiments, the branch naming standards may comprise, for example without limitation, feature/* for all new features or new functionality, and/or bug fix/* for any code fixes. In exemplary embodiments, the branch naming standards module 118 may comprise a database of acceptable branch naming standards.

The branch key naming patterns for the branch naming standards module 118 may be maintained in one or more databases. For example, without limitation, the database(s) may comprise Feature and Bugfix values. To provide a more specific example, without limitation, if a new feature is being added to VM, the branch name may be required to follow the Feature/VM format, and if a bug fix is being worked on in VM, the branch name requirement may be Bugfix/VM.

The documentation check module 120 may comprise an automated governance check to validate whether documentation is provided for proposed source code changes, such as in the Changelog file, by way of non-limiting example. Essentially, the documentation check module 120 may simply check to see if there is modification to the Changelog, or other equivalent, file. The documentation check module 120 may be further configured to automatically review and note any modifications to the Changelog, or other equivalent, file. The documentation check module 120 may utilize a comparison tool in exemplary embodiments, such as against one or more prior versions of the Changelog, or other equivalent, file to check for such changes. Alternatively, or additionally, the documentation check module 120 may be configured to check for the existence of the Changelog, or other equivalent, file and/or a modification date of the file, by way of other non-limiting examples.

Alternatively, or additionally, the documentation check module 120 may comprise, or be able to access, one or more database(s) maintained with a list of required file names and/or types. When a new PR is submitted, the documentation check module 120 may be configured to check for the existence of the modified files against those listed in the database(s). If the list of required files does not exist or is not provided, the PR may be automatically rejected.

The coding standards check module 122 may comprise a parameter syntax check module 124, a provider syntax check module 126, combinations thereof, or the like. The system 100 may be configured to perform the coding standards check module 122 after the naming and documentations check module 116 (assuming the naming and documentations check module 116 is successfully completed), in exemplary embodiments, though such is not required. The parameter syntax check module 124 may be configured to review some or all user input variables declared to determine if corresponding variable types and/or descriptions are added. In this manner, the purpose of the variables and what type of data can be passed to the variable may be better understood and/or documented. The coding standards check module 122 may be configured to search for such corresponding fields or notations in the proposed IaC source code changes in exemplary embodiments.

All IaC variables may have a pre-defined format. The parameter syntax check module 124 may be configured to parse content of the file(s) and validate that the parsed content meets with pre-defined condition(s) (e.g., format(s)).

The provider syntax check module 126 may be configured to check for specific components of the provider configurations. For example, without limitation, if feature { } block is defined.

All the provider(s) may have pre-defined syntax. The provider syntax check module 126 may be configured to parse content of the file(s) and validate that the parsed content meets with pre-defined condition(s) (e.g., syntax(es)).

The test cases and security check module 128 may comprise a test cases module 130, a security check module 132, combinations thereof, or the like. The system 100 may be configured to perform the test cases and security check module 128 after the naming and documentation check module 116 and/or the coding standards check module 122 (assuming one or both are successfully completed), in exemplary embodiments, though such is not required. The test cases and security check module 128 may be configured to check the functionality of the module, such as but not limited to, by applying various predefined and/or custom test cases to the proposed source code changes which may involve simulated use or deployment, verify that certain security features are present, verify that certain security standards are utilized, combinations thereof, or the like. Once the resource is deployed, the test cases and security check module 128 may be configured to periodically or continuously check for adherence to security standards.

The test cases module 130 may be configured to implement one or more developed test cases for every feature supported/applicable by the given service, such as with the principle of infrastructure deployment should be incremental. As part of test cases validations, cloud resources may be deployed based on end-user input parameter values. Even though the testing resources may be built using tfvar, or equivalent, variables provided by the user, for example, some of the properties of the variable values may be ignored or replaced with standard values. The input variables for the test cases module 130 may divided into three categories, in exemplary embodiments: 1) properties that cause the resource to destroy: Any properties that replace a resource are randomly generated (e.g., resource names); 2) Standard properties: specific properties that have standard values may be hardcoded inside Terratest cases, by way of example (e.g., TLS setting); and 3) User input parameters: Any server properties that are not covered in the above two may fall into this category, and the process will read the values from tfvar, or equivalent, files for example.

The security check module 132 may be configured to, such as once the resource deployment and multiple test cases are validated using cloud provider SDK, validate the resource's properties based on what end-users pass.

The security standards may vary, such as by cloud service provider. Organization security standards may be pre-defined in one or more database(s) accessible by, or contained within, the security check module 132, and the security check module 132 may be configured to compare the user-provided values across these database(s). If there are any deviations, the security check module 132 may be configured to auto-reject the PR.

As illustrated with particular regard to FIG. 3A-3B, the system 100 may require that the proposed source code changes pass each of the modules of the framework 110B, such as but not limited to, the naming and documentation check module 116, the coding standards check module 122, the test cases and security check module 128, combinations thereof, or the like. More specifically, the proposed source code changes may be required to pass each of the branch naming standards module 118, the documentation check module 120, the parameter syntax check module 124, the provider syntax check module 126, the test cases module 130, the security check module 132, combinations thereof, or the like. If one or more of these modules are not successfully passed, the system 100 may be configured to automatically reject the PR and/or source code changes. One or more notifications regarding the same may be automatically generated and transmitted, and may identify which module(s) were not passed.

Upon passing of each of the modules of the framework 110B, the system 100 may be configured to automatically trigger manual review, such as generally indicated at item 134, and approval prior to implementation 114. For example, the system 100 may automatically generate a workflow request notification transmitted to a particular one or ones of the user systems 104, such as but not limited to a director, manager, supervisor, review committee, combinations thereof, or the like, to perform the manual review. The system 100 may be configured to await approval from the manual review prior to the implementation 114. The system 100 may be configured to periodically send reminders if the review is not timely completed.

The system 100 may be configured to provide implementation 114 in an automated fashion, such as by way of one or more already scheduled or automatically scheduled updates 136 where the source code changes, which may optionally be stored in one or more temporary repositories 106, are merged into the end user repository 106A for implementation. The source code changes may be automatically tagged, a new release may be automatically created, and may be pushed to certified modules, in exemplary embodiments.

The system 100 may be configured to require that each of the modules be passed sequentially and/or simultaneously. While an exemplary order of modules is provided in FIG. 3A-3B, the order may be different from what is illustrated. Furthermore, certain modules may be omitted, repeated, and/or added.

In exemplary embodiments, where the branch naming standards module 118 is not successfully passed, the system 100 may be configured to automatically reject the PR and any notifications generated by the system 100 may indicate the same. Where the other modules of the workflow 110B are not successfully completed, the system 100 may be configured to automatically determine that that all prerequisites have not been fulfilled and any notifications generated by the system 100 may indicate the same, including the specific module(s) failed, though such is not required. Regardless, the system 100 may be configured to prevent implementation 114 of any proposed source code changes not indicated as having successfully completed each and every step of the workflow 102B.

Figure 4:
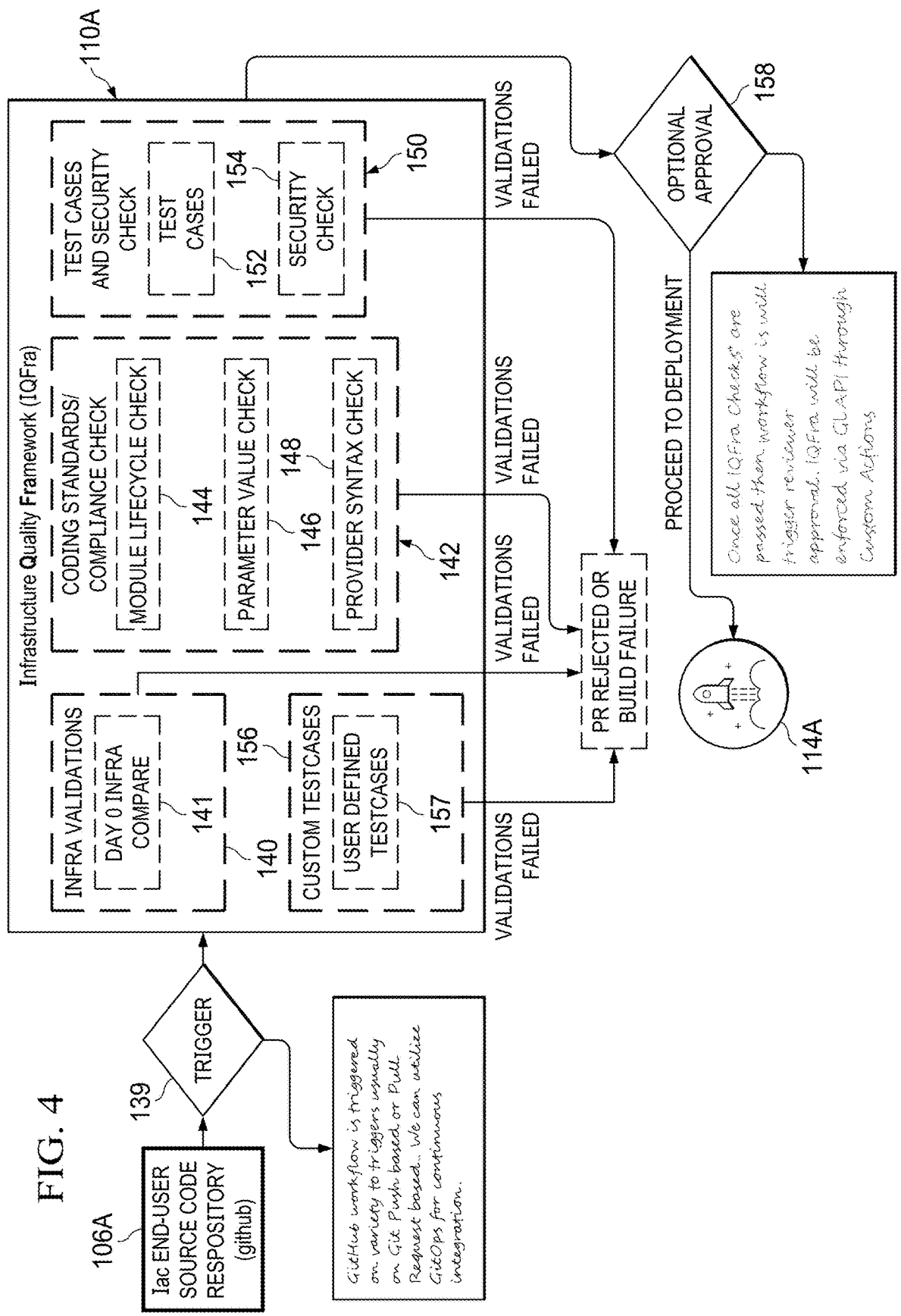
FIG. 4 is a plan view of an exemplary quality assurance framework for application teams for the workflow of FIG. 1.
Figure 5B:
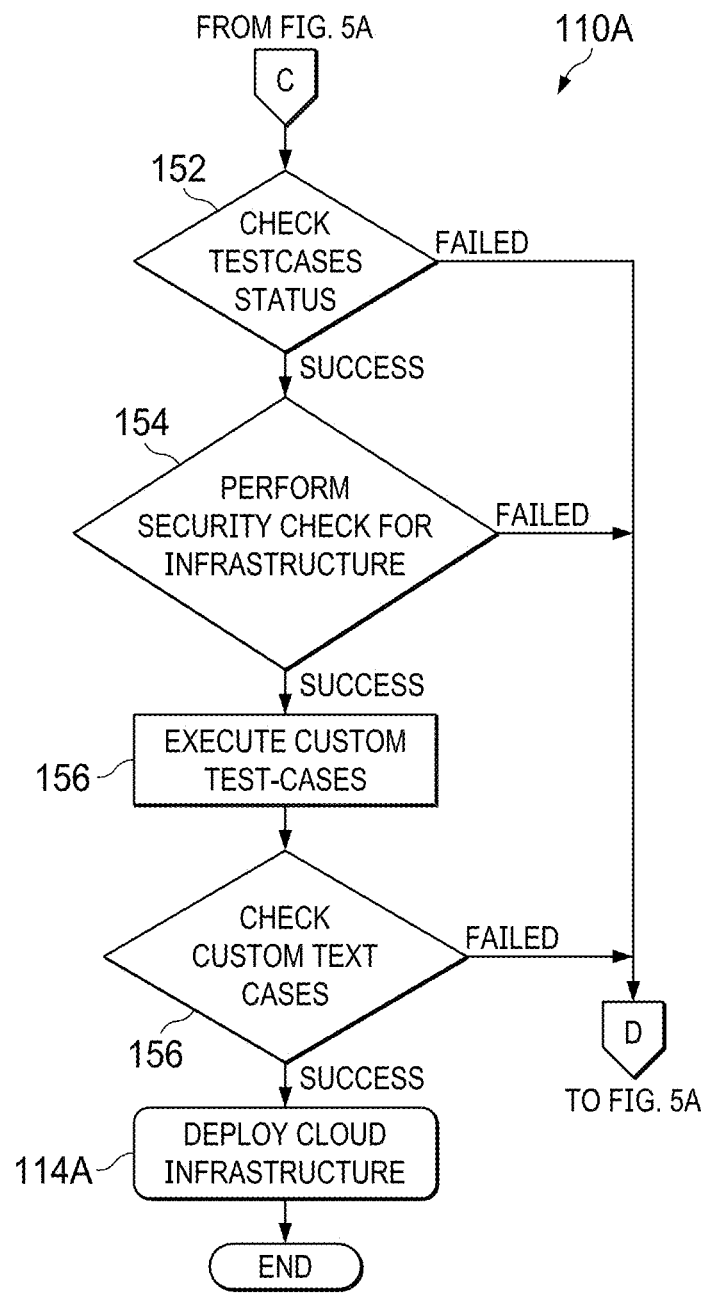
FIG. 5B is a continuation of the flow chart of FIG. 5A.

FIG. 4 illustrates an exemplary quality assurance framework 110A for the application development team 104A. FIG. 5A through FIG. 5B illustrate exemplary logic for the application team specific version of the quality assurance framework 110A.

Upon initiation of a PR, as noted generally at item 139, proposed source code changes, such as IaC source code may be identified or placed in a repository 106A, which may be existing or created. The system 100 may be configured to automatically initiate the framework 110A. For example, without limitation, the PR may indicate that the proposed source code changes are for IaC source code or the PR may otherwise be associated with data indicating the same. The system 100 may be configured to identify that the applications development specific version of the quality assurance framework 110A from data in the PR, the user machine, user, or team 104 associated with the PR by way of non-limiting example.

The framework 110A may comprise an infrastructure validations module 140, a coding standards and compliance check module 142, a test cases and security check module 150, a custom testcases module 156, combinations thereof, or the like.

The infrastructure validations module 140 may comprise a day zero infrastructure comparison module 141 or the like. The day zero infrastructure comparison module 141 may help to avoid any errors while deploying cloud resources. For example, on Day-0, a cloud resource is deployed with Standard_4 size, and on Day-5, if a user by mistake changes the value to Standard_2, the deployment will still be a success, but it may cause performance issues once deployed. This day zero infrastructure comparison module 141 may help avoid such scenarios by providing an automated comparison of the changed IaC source code against the original, day zero, IaC source code. Alternatively, or additionally, the infrastructure validations module 140 may be configured to provide automated comparison against any prior version(s) of the IaC source code.

The coding standards and compliance check module 142 may comprise a lifecycle check module 144, a parameter value check module 146, a provider syntax check module 148, combinations thereof, or the like.

The lifecycle check module 144, in exemplary embodiments, may be configured to automatically check for an up-to-date IaC tag. The deployment will fail if an application team 104A is deploying a cloud resource with an old IaC tag. This will help to ensure that only latest and supported IaC modules are deployed in the cloud. A database or text file of current tag(s) and/or acceptable formatting of current tags may be stored and checked against the tag associated with the PR request to ensure compliance.

The parameter value check module 146 may be configured to verify that certain recommendations, such as but not limited to disaster recovery recommendations, are followed. By default, terraform validates only the values of a given parameter; it cannot cross-validate parameter values and ensure certain recommendations are followed. This module will enhance the functionality. If an application team 104A deploys the Tier-1 application and sets high Availability (HA) to false, the deployment will fail as this does not match with disaster recovery recommendations, by way of non-limiting example.

The parameter value check module 146 may comprise, or be able to access, one or more database(s) with recommendations, such as from various teams across an organization. Every time the parameter value check module 146 is called, all the user-specified parameter values may be cross-validated across these database(s) before the system 100 permits procession to the next steps. For example, without limitation, environment types may be set only be between Dev, QA, Int, and Prod. As another example, without limitation, all tier-1,2 prod services may be required to have a High Availability configuration set to true. As another example, without limitation, certain combinations of cloud service values may be required.

The provider syntax check module 148 may be configured to ensure that the correct syntax is followed when declaring the provider component of terraform. Utilized syntax in the proposed IaC source code changes may be compared against a database of acceptable syntax, by way of non-limiting example.

The test cases and security check module 150 may comprise a predefined test cases module 152, a security check module 154, combinations thereof, or the like. The predefined test case module 152 may be configured to automatically run one or more user-requested test cases and revalidate the resource properties that are deployed. The test cases may be configured to simulate deployment of the resources, and property validations may be run on resource properties. This may ensure there are no syntax errors (e.g., special characters in server names), and/or provide property validations (e.g., revalidate parameter values actual resources deployment).

The test cases module 152 may comprise one or more predefined test cases. As cloud infrastructure deployment may be incremental, the test cases execution may also be incremental. On day-0, only a storage account is deployed, for example, only the storage account creation test cases may be run. When new functionality is added to create a blob container, for example, new predefined test case(s) may be added to replicate the same (e.g., deploy storage account and add blob container to existing storage). The actual deployment may be performed during test case execution, increasing the application team's 104A confidence before release. The test cases module 152 may utilize one or more emulators to simulate activating resources, executing some or all of the changed code or the whole IaC code and/or other code, employing various processes using the changed code, and deactivating the resources, by way of non-limiting example.

The security check module 154 may be configured to validate that the parameters of the IaC are validated to certain standards before deployment. This module 154 may act as a secondary line of check, such as to validate resource properties once it is deployed.

The custom test cases module 156 may comprise a user defined test cases module 157 or the like. Similar to the predefined test case module 152, the custom test cases module 156 may instead permit user to automatically run custom test case(s). The custom test case module 152 may allow end-users to run their own test cases. This may help to integrate infrastructure with application code and test cases. For example, without limitation, both infrastructure and application test cases may be integrated where an application service and deploy code are deployed as part of the same repository 106.

As illustrated with particular regard to FIG. 5A-5B, the framework 110A may require that the proposed IaC source code changes successfully pass each of the infrastructure validations module 140, the coding standards and compliance check module 142, the test cases and security check module 150, the custom testcases module 156, combinations thereof, or the like, such as but not limited to in sequence. More specifically, the IaC source code may be required to pass each of the day zero infrastructure comparison module 141, the lifecycle check module 144, the parameter value check module 146, the provider syntax check module 148, the security check module 154, the user defined test cases module 157, combinations thereof, or the like. If one or more of these modules are not passed, the system may be configured to automatically reject the IaC source code changes. One or more notifications regarding the same may be automatically generated and transmitted, and may identify which module(s) were not passed. Upon passing of each of the modules, the IaC source code changes may be automatically provided to one or more reviews for manual approval 158 prior to implementation 114. Such implementation 114 may be performed in an automated fashion, such as by way of one or more already scheduled or automatically scheduled updates where the IaC source code changes, which may optionally be stored in one or more temporary repositories 106, are merged into the working repository 106A for deployment 114.

The system 100 may be configured to require that each of the modules be passed sequentially and/or simultaneously. While an exemplary order of modules is provided in FIG. 5A-5B, the order may be different from what is illustrated. Furthermore, certain modules may be omitted, repeated, and/or added. Where any of the modules of the workflow 110A are not successfully completed, the system 100 may be configured to automatically determine that that all prerequisites have not been fulfilled and any notifications generated by the system 100 may indicate the same, including the specific module(s) failed, though such is not required.

Some or all of the modules, quality checks, workflows, combinations thereof, or the like shown and/or described herein may be performed automatically and in any order, though certain advantages may be achieved by performance in the order shown and/or described herein. Certain other advantages may be achieved through different orders.

Any embodiment of the present invention may include any of the features of the other embodiments of the present invention. The exemplary embodiments herein disclosed are not intended to be exhaustive or to unnecessarily limit the scope of the invention. The exemplary embodiments were chosen and described in order to explain the principles of the present invention so that others skilled in the art may practice the invention. Having shown and described exemplary embodiments of the present invention, those skilled in the art will realize that many variations and modifications may be made to the described invention. Many of those variations and modifications will provide the same result and fall within the spirit of the claimed invention. It is the intention, therefore, to limit the invention only as indicated by the scope of the claims.

Certain operations described herein may be performed by one or more electronic devices. Each electronic device may comprise one or more processors, electronic storage devices, executable software instructions, combinations thereof, and the like configured to perform the operations described herein. The electronic devices may be general purpose computers or specialized computing devices. The electronic devices may comprise personal computers, smartphone, tablets, databases, servers, or the like. The electronic connections and transmissions described herein may be accomplished by wired or wireless means. The computerized hardware, software, components, systems, steps, methods, and/or processes described herein may serve to improve the speed of the computerized hardware, software, systems, steps, methods, and/or processes described herein.

What is claimed is:

1. A method for providing an automated quality assurance framework for infrastructure as code ("IaC") implementations, said method comprising the steps of:
   electronically receiving a pull request associated with a proposed change to existing IaC source code ("changed code") from a device identified as associated with one of: a service enablement team member and an applications development team member;
   where said pull request originates from a device indicated as associated with the service enablement team member, electronically and automatically:
   applying a naming and documentation check module to the changed code which compares names in the changed code against a database of names for a match and verifies that updates have been made to an electronic log;
applying a coding standards check module to the changed code which verifies that predetermined syntax standards are adhered to in the changed code; and
applying a test case and security check module to the changed code which verifies that a predetermined test case is executable in the changed code and that configurations are utilized in the changed code; and
where said pull request originates from a device indicated as associated with the applications development team member, electronically and automatically:
applying an infrastructure validations module to the changed code which compares at least part of the changed code against at least some aspects of a prior version of the existing IaC source code;
applying a coding standards and compliance check module to the changed code which verifies that predetermined standards present in the changed code; and
applying the test case and security check module to the changed code.

2. The method of claim 1 further comprising:
creating a new working code area within said a source code repository for temporary storage of said changed code for each of said pull requests;
upon receipt of data indicating successful completion of the quality assurance framework, automatically and electronically merging the changed code into the existing IaC source code;
generating a failure notification where the quality assurance framework associated with the respective one of the pull requests is not successfully passed; and
transmitting the respective one of the failure notifications to a user device from which the respective one of the pull requests is indicated as originating, wherein each of said failure notifications comprise an indication of which portion of said quality assurance framework was not successfully passed for said respective one of said pull requests.

3. The method of claim 2 wherein:
said step of merging the changed code into the existing IaC source code comprises:
creating a new release; and
tagging the changed code with a new tag.

4. The method of claim 1 further comprising:
triggering a manual review of the changed code.

5. The method of claim 1 wherein:
said naming and documentation check module comprises:
a branch naming standards module which compares branch names used against a database of predetermined, acceptable naming standards; and
a documentation check module which verifies that modifications have been made to a change log file.

6. The method of claim 1 wherein:
said coding standards check module comprises:
a parameter syntax check module which verifies that variable types and descriptions are provided; and
a provider syntax check module which verifies that specific provider configuration fields are provided.

7. The method of claim 1 wherein:
said test case and security check module comprises:
a predefined test cases module which applies a predefined test case simulating deployment or use to the changed code; and
a security check module which verifies that certain predetermined, recommended security configurations are utilized in the changed code.

8. The method of claim 1 wherein:
the infrastructure validations module comprises a day zero infrastructure comparison module which compares the changed code against a prior version of the existing IaC source code values provided by a user.

9. The method of claim 1 wherein:
the coding standards and compliance check module comprises:
a lifecycle check module which verifies that an up-to-date tag is provided with the changed code;
a parameter value check module which verifies that certain predetermined disaster recommendations are followed; and
a provider syntax check module which compares the changed code against a database of acceptable syntax.

10. The method of claim 1 wherein:
said naming and documentation check module comprises:
a branch naming standards module which compares branch names used against a database of predetermined, acceptable naming standards; and
a documentation check module which verifies that modifications have been made to a change log file;
said coding standards check module comprises:
a parameter syntax check module which verifies that variable types and descriptions are provided; and
a provider syntax check module which verifies that specific provider configuration fields are provided;
said test case and security check module comprises:
a predefined test cases module which applies a predefined test case simulating deployment or use to the changed code; and
a security check module which verifies that certain predetermined, recommended security configurations are utilized in the changed code;
the infrastructure validations module comprises a day zero infrastructure comparison module which compares the changed code against a prior version of the existing IaC source code values provided by a user; and
the coding standards and compliance check module comprises:
a lifecycle check module which verifies that an up-to-date tag is provided with the changed code;
a parameter value check module which verifies that certain predetermined disaster recommendations are followed; and
a provider syntax check module which compares the changed code against a database of acceptable syntax.

11. A system for providing an automated quality assurance framework for infrastructure as code ("IaC") implementations, said system comprising:
an IaC source code repository storing existing IaC source code;
user devices, a first of which is associated with an applications development team member, and a second of which is associated with a service enablement team member;
one or more electronic storage devices comprising software instructions, which when executed, configure one or more processors to:
receive pull requests, each associated with a proposed change to the existing IaC source code ("changed code") and indicated as originating from the first one or the second one of the user devices;
where a respective one of the pull requests is indicated as originating from the first one of the user devices:
apply a naming and documentation check module to the changed code which compares certain names in the changed code against a database of names for a match and verify that updates have been made to a certain log when applied;
apply a coding standards check module to the changed code which verifies that certain predetermined syntax standards are adhered to in the changed code when applied; and
apply a test case and security check module to the changed code which verifies that at least one predetermined test case is executable in the changed code and that certain configurations are utilized in the changed code when applied;
where the respective one of the pull requests is indicated as originating from the second one of the user devices:
apply an infrastructure validations module to the changed code which compares at least part of the changed code against at least certain aspects of at least one prior version of the existing IaC source code when applied;
apply a coding standards and compliance check module to the changed code which verifies that certain predetermined standards present in the changed code when applied; and
apply the test case and security check module to the changed code.

12. The system of claim 11 wherein:
said one or more electronic storage devices comprise additional software instructions, which when executed, configure the one or more processors to:
create a new working code area within said source code repository for temporary storage of said changed code for each of said pull requests;
automatically merge the changed code into the existing IaC source code stored at the IaC source code repository following receipt of data indicating successful completion of the quality assurance framework;
generate a failure notification where the quality assurance framework associated with the respective one of the pull requests is not successfully passed; and
transmit the respective one of the failure notifications to the user device from which the respective one of the pull requests is indicated as originating, wherein each of said failure notifications comprise an indication of which portion of said quality assurance framework was not successfully passed for said respective one of said pull requests.

13. The system of claim 11 wherein:
said naming and documentation check module comprises:
a branch naming standards module which compares branch names used against a database of predetermined, acceptable naming standards; and
a documentation check module which verifies that modifications have been made to a change log file;
said coding standards check module comprises:
a parameter syntax check module which verifies that variable types and descriptions are provided; and
a provider syntax check module which verifies that specific provider configuration fields are provided;

said test case and security check module comprises:
a predefined test cases module which applies a predefined test case simulating deployment or use to the changed code; and
a security check module which verifies that certain predetermined, recommended security configurations are utilized in the changed code;
the infrastructure validations module comprises a day zero infrastructure comparison module which compares the changed code against a prior version of the existing IaC source code values provided by a user; and
the coding standards and compliance check module comprises:
a lifecycle check module which verifies that an up-to-date tag is provided with the changed code;
a parameter value check module which verifies that certain predetermined disaster recommendations are followed; and
a provider syntax check module which compares the changed code against a database of acceptable syntax.

14. The system of claim 11 wherein:
said naming and documentation check module comprises:
a branch naming standards module which compares branch names used against a database of predetermined, acceptable naming standards; and
a documentation check module which verifies that modifications have been made to a change log file.

15. The system of claim 11 wherein:
said coding standards check module comprises:
a parameter syntax check module which verifies that variable types and descriptions are provided; and
a provider syntax check module which verifies that specific provider configuration fields are provided.

16. The system of claim 11 wherein:
said test case and security check module comprises:
a predefined test cases module which applies a predefined test case simulating deployment or use to the changed code; and
a security check module which verifies that certain predetermined, recommended security configurations are utilized in the changed code.

17. The system of claim 11 wherein:
the infrastructure validations module comprises a day zero infrastructure comparison module which compares the changed code against a prior version of the existing IaC source code values provided by a user.

18. The system of claim 11 wherein:
the coding standards and compliance check module comprises:
a lifecycle check module which verifies that an up-to-date tag is provided with the changed code;
a parameter value check module which verifies that certain predetermined disaster recommendations are followed; and
a provider syntax check module which compares the changed code against a database of acceptable syntax.

19. A system for providing an automated quality assurance framework for infrastructure as code ("IaC") implementations, said system comprising:
an IaC source code repository storing existing IaC source code;
user devices, a first of which is associated with an applications development team member, and a second of which is associated with a service enablement team member;

one or more electronic storage devices comprising software instructions, which when executed, configure one or more processors to:
receive pull requests, each associated with a proposed change to the existing IaC source code ("changed code") and indicated as originating from the first one or the second one of the user devices;
create a new working code area within said source code repository for temporary storage of said changed code for each of said pull requests;
where a respective one of the pull requests is indicated as originating from the first one of the user devices, automatically apply an applications development specific quality assurance framework module;
where the respective one of the pull requests is indicated as originating from the second one of the user devices, automatically apply a service enablement team specific quality assurance framework module which is different from the applications development specific quality assurance framework module;
following receipt of data indicating successful completion of respective the quality assurance framework module for the changed code associated with the respective one of the pull requests, merge the changed code from the new working code area into the existing IaC source code stored at the IaC source code repository for execution;
following receipt of data indicating that the respective quality assurance framework module is not successfully passed for the changed code associated with the respective one of the pull requests, generate and transmit a failure notification to the user device from which the respective one of the pull requests is indicated as originating, where said failure notification indicates which portion of said quality assurance framework module was not successfully passed for said respective one of said pull requests.

20. The system of claim 19 wherein:
the applications development specific quality assurance framework module, when executed, configures the one or more processor to:
apply a naming and documentation check module to the changed code which compares certain names in the changed code against a database of names for a match and verify that updates have been made to a certain log when applied;
apply a coding standards check module to the changed code which verifies that certain predetermined syntax standards are adhered to in the changed code when applied; and
apply a test case and security check module to the changed code which verifies that at least one predetermined test case is executable in the changed code and that certain configurations are utilized in the changed code when applied; and
the service enablement team specific quality assurance framework module, when executed, configures the one or more processor to:
apply an infrastructure validations module to the changed code which compares at least part of the changed code against at least certain aspects of at least one prior version of the existing IaC source code when applied;
apply a coding standards and compliance check module to the changed code which verifies that certain predetermined standards present in the changed code when applied; and
apply the test case and security check module to the changed code.

* * * * *